United States Patent
Xue et al.

(10) Patent No.: US 11,562,225 B2
(45) Date of Patent: Jan. 24, 2023

(54) AUTOMATIC MONITORING AND ADJUSTMENT OF MACHINE LEARNING MODEL TRAINING

(71) Applicant: INTERNATIONAL BUSINESS MACHINES CORPORATION, Armonk, NY (US)

(72) Inventors: Chao Xue, Beijing (CN); Rong Yan, Beijing (CN); Yonghua Lin, Beijing (CN); Yonggang Hu, Richmind Hill (CA); Yu Song, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1095 days.

(21) Appl. No.: 16/199,823

(22) Filed: Nov. 26, 2018

(65) Prior Publication Data

US 2020/0167639 A1    May 28, 2020

(51) Int. Cl.
*G06N 3/08* (2006.01)
*G06K 9/62* (2022.01)

(52) U.S. Cl.
CPC .............. *G06N 3/08* (2013.01); *G06K 9/6257* (2013.01); *G06K 9/6296* (2013.01)

(58) Field of Classification Search
CPC ....... G06N 3/08; G06K 9/6257; G06K 9/6296
See application file for complete search history.

(56) References Cited

U.S. PATENT DOCUMENTS

| 2012/0191395 | A1* | 7/2012 | Bandsmer ............ G01D 18/008 |
| | | | 702/179 |
| 2015/0286955 | A1 | 10/2015 | Virkar et al. |
| 2017/0193052 | A1 | 7/2017 | Grehant |
| 2017/0220930 | A1 | 8/2017 | Hachmeister et al. |
| 2018/0165603 | A1* | 6/2018 | Van Seijen .......... G06N 3/0454 |
| 2018/0286038 | A1* | 10/2018 | Jalali ...................... G06N 3/086 |
| 2018/0314163 | A1* | 11/2018 | Liu ......................... G06F 30/20 |
| 2018/0357152 | A1* | 12/2018 | Browne ............. G06F 11/3664 |
| 2020/0021607 | A1* | 1/2020 | Muddu ............... G06F 3/04847 |

FOREIGN PATENT DOCUMENTS

| CA | 2744136 A1 * | 6/2010 | ........... G06F 19/321 |
| CN | 109477736 A * | 3/2019 | ........... G01D 18/002 |

\* cited by examiner

*Primary Examiner* — Qun Shen
(74) *Attorney, Agent, or Firm* — Tutunjian & Bitetto, P.C.; Joseph Petrokaitis

(57) ABSTRACT

Methods and systems for training a machine learning model include training a machine learning model using training data. A status of the machine learning model's training is determined based on an accuracy curve of the machine learning model over the course of the training. Parameters of the training are adjusted based on the status. Training of the machine learning model is completed using the adjusted parameters.

18 Claims, 7 Drawing Sheets

AUTOMATIC MONITORING AND ADJUSTMENT OF MACHINE LEARNING MODEL TRAINING

BACKGROUND

Technical Field

The present invention generally relates to machine learning systems and, more particularly, to the automatic monitoring and tuning of the training of machine learning models.

Description of the Related Art

An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Referring now to FIG. 1, a generalized diagram of a neural network is shown. ANNs demonstrate an ability to derive meaning from complicated or imprecise data and can be used to extract patterns and detect trends that are too complex to be detected by humans or other computer-based systems. The structure of a neural network is known generally to have input neurons 102 that provide information to one or more "hidden" neurons 104. Connections 108 between the input neurons 102 and hidden neurons 104 are weighted and these weighted inputs are then processed by the hidden neurons 104 according to some function in the hidden neurons 104, with weighted connections 108 between the layers. There may be any number of layers of hidden neurons 104, and as well as neurons that perform different functions. There exist different neural network structures as well, such as convolutional neural network, maxout network, etc. Finally, a set of output neurons 106 accepts and processes weighted input from the last set of hidden neurons 104.

This represents a "feed-forward" computation, where information propagates from input neurons 102 to the output neurons 106. Upon completion of a feed-forward computation, the output is compared to a desired output available from training data. The error relative to the training data is then processed in "feed-back" computation, where the hidden neurons 104 and input neurons 102 receive information regarding the error propagating backward from the output neurons 106. Once the backward error propagation has been completed, weight updates are performed, with the weighted connections 108 being updated to account for the received error. This represents just one variety of ANN.

SUMMARY

A method for training a machine learning model include training a machine learning model using training data. A status of the machine learning model's training is determined based on an accuracy curve of the machine learning model over the course of the training. Parameters of the training are adjusted based on the status. Training of the machine learning model is completed using the adjusted parameters.

A system for training a machine learning module includes a processor device and a machine learning model. A training module is configured to train the machine learning model using training data. A training status module is configured to use the processor device to determine a status of the machine learning model's training based on an accuracy curve of the machine learning model over the course of the training. A training parameter module is configured to adjusting parameters of the training based on the status. The training module is further configured to finish training the machine learning model using the adjusted parameters.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention monitor the status of a machine learning training process to determine whether the process is, for example, underfitting, overfitting, diverging, converging, ongoing, etc. This information can then be used to change training parameters, continue or halt the training process, or modify the structure of the machine learning model. Although the present embodiments are specifically described with respect to artificial neural networks (ANNs), it should be understood that the present embodiments can alternatively be applied to any form of machine learning training process.

The present embodiments monitor accuracy measurements of the machine learning model's output during training. These accuracy measurements exhibit patterns over time that are indicative of various training states and can be used to determine how best to guide the training process.

Figure 1:
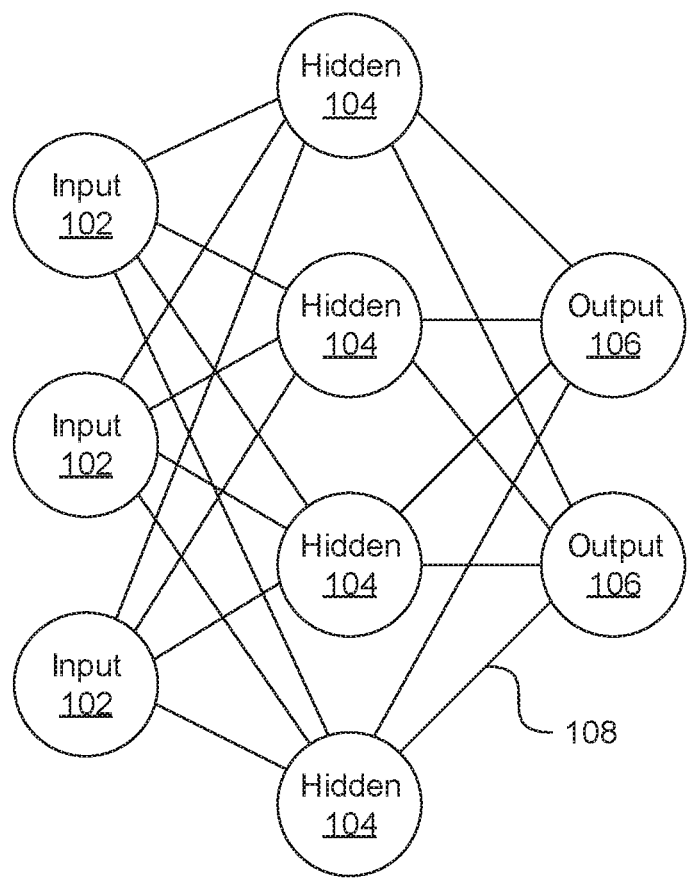
FIG. 1 is a prior art diagram of an artificial neural network.
Figure 2:
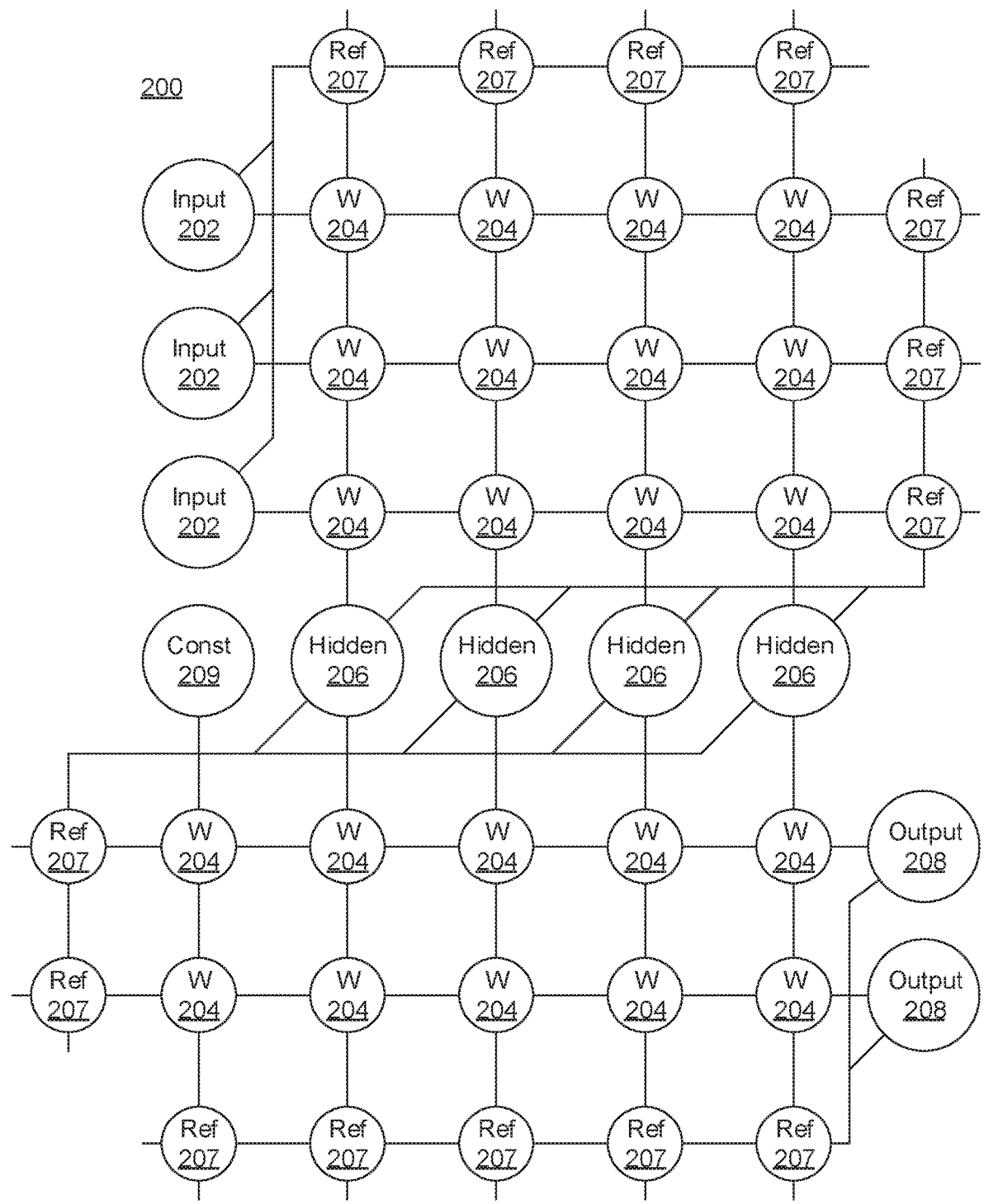
FIG. 2 is a block diagram of an illustrative embodiment of the neurons and weights in an exemplary neural network in accordance with an embodiment of the present invention.

Referring now to the drawings in which like numerals represent the same or similar elements and initially to FIG. 2, an artificial neural network ANN architecture 200 is shown. It should be understood that the present architecture is purely exemplary and that other architectures or types of neural network may be used instead. The present embodiments are particularly described with respect to a hardware embodiment that implements the neurons and weights as physical circuits, but it should be understood that neural networks are commonly implemented in software embodiments as well. The hardware embodiment is employed herein to provide an intuitive understanding of how neural network computations are performed and should not be construed as limiting in any way.

During feed-forward operation, a set of input neurons 202 each provide an input voltage in parallel to a respective row of weights 204. The weights 204 each have a settable resistance value, such that a current output flows from the weight 204 to a respective hidden neuron 206 to represent the weighted input. The current output by a given weight is determined as $$I = \frac{V}{r},$$

where V is the input voltage from the input neuron 202 and r is the set resistance of the weight 204. The current from each weight adds column-wise and flows to a hidden neuron 206. A set of reference weights 207 have a fixed resistance and combine their outputs into a reference current that is provided to each of the hidden neurons 206. Because conductance values can only be positive numbers, some reference conductance is needed to encode both positive and negative values in the matrix. The currents produced by the weights 204 are continuously valued and positive, and therefore the reference weights 207 are used to provide a reference current, above which currents are considered to have positive values and below which currents are considered to have negative values.

As an alternative to using the reference weights 207, another embodiment may use separate arrays of weights 204 to capture negative values. Each approach has advantages and disadvantages. Using the reference weights 207 is more efficient in chip area, but reference values need to be matched closely to one another. In contrast, the use of a separate array for negative values does not involve close matching as each value has a pair of weights to compare against. However, the negative weight matrix approach uses roughly twice the chip area as compared to the single reference weight column. In addition, the reference weight column generates a current that needs to be copied to each neuron for comparison, whereas a negative matrix array provides a reference value directly for each neuron. In the negative array embodiment, the weights 204 of both positive and negative arrays are updated, but this also increases signal-to-noise ratio as each weight value is a difference of two conductance values. The two embodiments provide identical functionality in encoding a negative value and those having ordinary skill in the art will be able to choose a suitable embodiment for the application at hand.

The hidden neurons 206 use the currents from the array of weights 204 and the reference weights 207 to perform some calculation. The hidden neurons 206 then output a voltage of their own to another array of weights 204. This array performs in the same way, with a column of weights 204 receiving a voltage from their respective hidden neuron 206 to produce a weighted current output that adds row-wise and is provided to the output neuron 208.

It should be understood that any number of these stages may be implemented, by interposing additional layers of arrays and hidden neurons 206. It should also be noted that some neurons may be constant neurons 209, which provide a constant voltage to the array. The constant neurons 209 can be present among the input neurons 202 and/or hidden neurons 206 and are only used during feed-forward operation.

During back propagation, the output neurons 208 provide a voltage back across the array of weights 204. The output layer compares the generated network response to training data and computes an error. The error is applied to the array as a voltage pulse, where the height and/or duration of the pulse is modulated proportional to the error value. In this example, a row of weights 204 receives a voltage from a respective output neuron 208 in parallel and converts that voltage into a current which adds column-wise to provide an input to hidden neurons 206. The hidden neurons 206 combine the weighted feedback signal with a derivative of its feed-forward calculation and stores an error value before outputting a feedback signal voltage to its respective column of weights 204. This back propagation travels through the entire network 200 until all hidden neurons 206 and the input neurons 202 have stored an error value.

During weight updates, the input neurons 202 and hidden neurons 206 apply a first weight update voltage forward and the output neurons 208 and hidden neurons 206 apply a second weight update voltage backward through the network 200. The combinations of these voltages create a state change within each weight 204, causing the weight 204 to take on a new resistance value. In this manner the weights 204 can be trained to adapt the neural network 200 to errors in its processing. It should be noted that the three modes of operation, feed forward, back propagation, and weight update, do not overlap with one another.

In one particular embodiment, the weights 204 may be implemented in software or in hardware, for example using relatively complicated weighting circuitry or using resistive cross point devices. Such resistive devices may have switching characteristics that have a non-linearity that can be used for processing data. The weights 204 may belong to a class of device called a resistive processing unit (RPU), because their non-linear characteristics are used to perform calculations in the neural network 200. RPU devices may be implemented with resistive random access memory (RRAM), phase change memory (PCM), programmable metallization cell (PMC) memory, or any other device that has non-linear resistive switching characteristics. Such RPU devices may also be considered as memristive systems.

Figure 3:
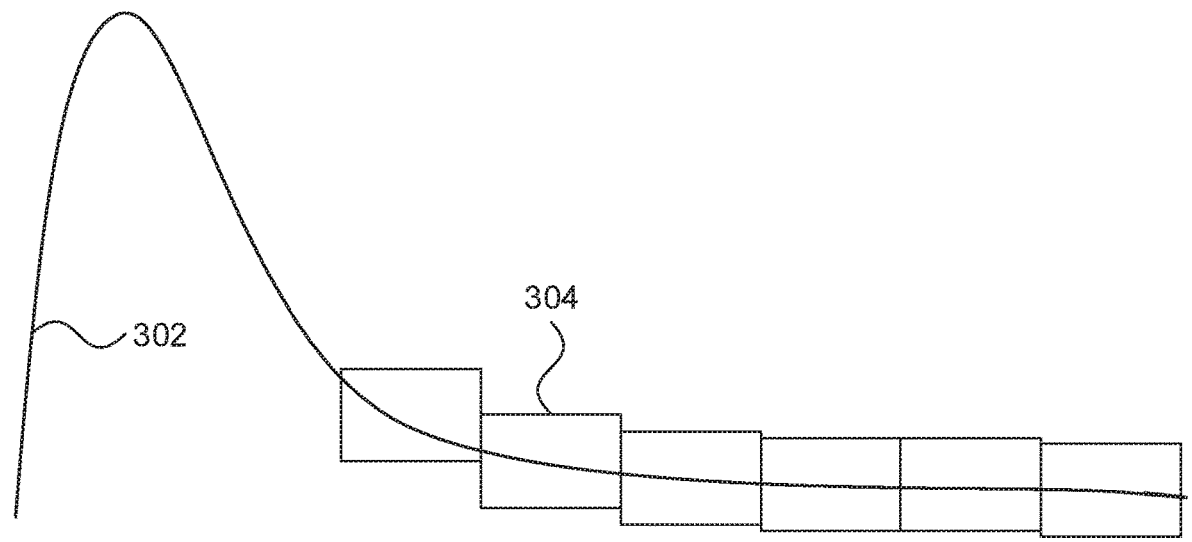
FIG. 3 is a diagram of a machine learning model training accuracy curve over time in accordance with an embodiment of the present invention.

Referring now to FIG. 3, an exemplary training accuracy curve is shown, with the vertical axis representing a loss function or errors and with the horizontal axis representing training time or a quantity of training data. As noted above, the curve 302 shows an initial transient period, where very little training data has been applied, followed be a longer tail. The present embodiments focus on the tail, using a set of windows 304 to characterize the behavior of the training accuracy curve over time. The size of the windows is a hyperparameter and can be estimated by cross-validation.

Exemplary values for the window size can be between 3 and 5. These values are measured relative to the training time and iterations and the sampling interval.

The present embodiments perform the analysis of the behavior of the training accuracy curve based on the slope of the curve in the windows 304 and the maximum slope of the curve after the maximum value. Thus, the value $K_{max}$ can be measured as an instantaneous value on the downward slope of the initial transient period. The windows can be measured at the first evaluation point or at any point thereafter.

Figure 4:
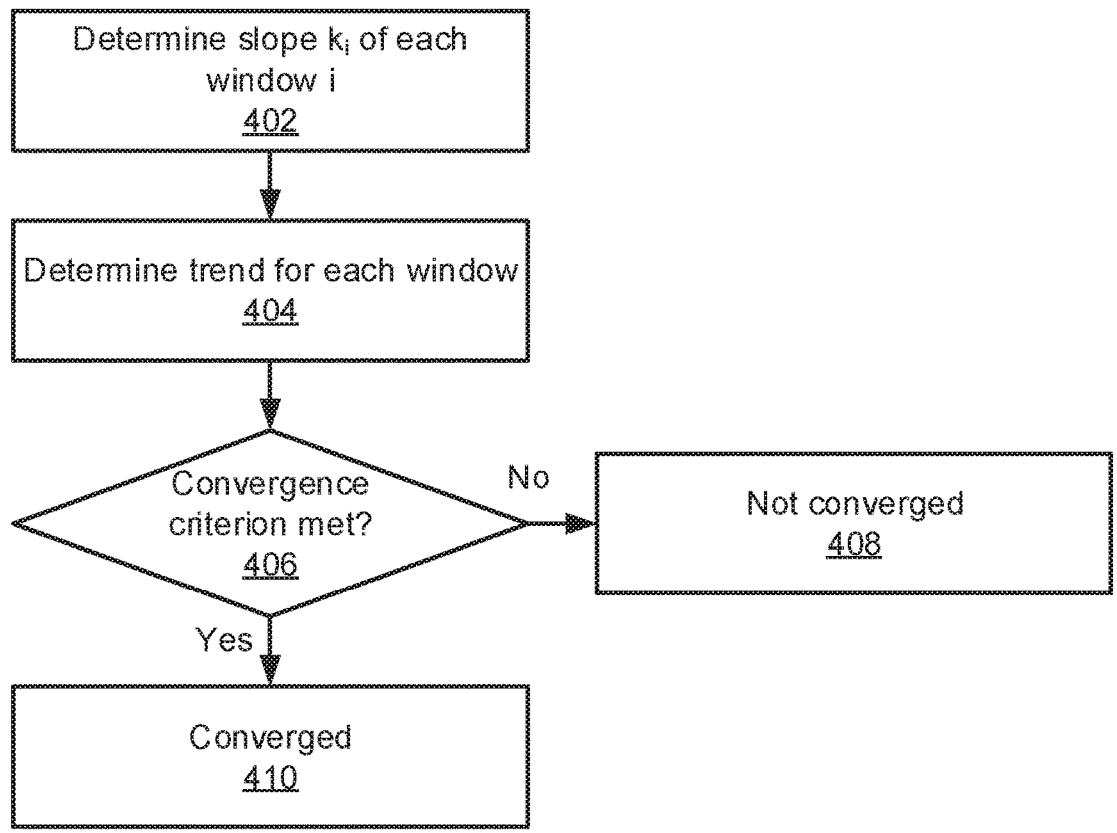
FIG. 4 is a block/flow diagram of a method of determining whether the training of a machine learning model has converged based on the training accuracy curve in accordance with an embodiment of the present invention.

Referring now to FIG. 4, a method of determining whether a training process has converged is shown. Block 402 determines the slope $k_i$ of each window i from the windows 304. This slope can be determined by any appropriate process, for example through linear regression or by simply comparing the final point on the curve within the window i to the first point on the curve within the window i.

Block 404 then determines a trend for each window i. In particular, block 404 calculates $|k_i|/K_{max}$ and compares the resulting value to a threshold. The threshold is a hyperparameter and can be set by cross-validation. If the value is below the threshold, then the trend for the window i is flat. If the value is above the threshold and $k_i$ is positive, then the trend for the window i is upward. If the value is above the threshold and $k_i$ is negative, then the trend for the window i is downward.

After the trend for each window i has been determined, block 406 determines whether a convergence criterion has been met. If not, then block 408 determines that the training process has not converged. If so, then block 410 determines that the training process has converged. An exemplary convergence criterion finds convergence if all of the windows i in a particular range have a "flat" trend and at least one slope $k_i > 0$. Thus, as time goes on and the curve in the windows being considered tend toward its final value, the convergence criterion may be met, whereas earlier windows may not yet meet the criterion because the show too high of a slope value.

Figure 5:
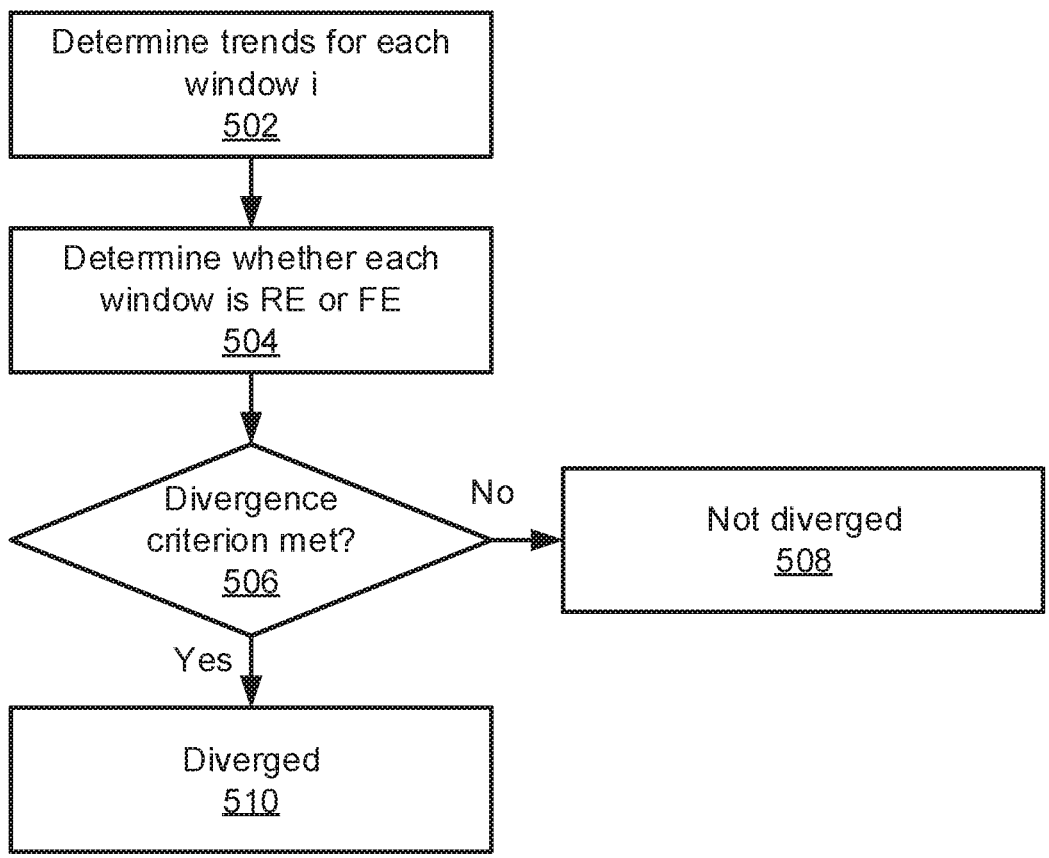
FIG. 5 is a block/flow diagram of a method of determining whether the training of a machine learning model has diverged based on the training accuracy curve in accordance with an embodiment of the present invention.

Referring now to FIG. 5, a method of determining whether a training process has converged is shown. Block 502 determines the trend for each window i as described above for the test for convergence. Block 504 then determines whether each window is a "rising edge" (RE) window or a "falling edge" (FE) window. Rising edge windows are those that transition from a downward slope at the beginning of the window to an upward slope at the end of the window, while falling edge windows are windows that transition from a downward slope at the beginning of the window to an upward slope at the end of the window. It is worth noting that a window with a positive slope at both the beginning and end or with a negative slope at both the beginning and end will not be considered to be RE or FE windows.

After each window has been designated RE or FE, block 506 determines whether a divergence criterion has been met. One exemplary divergence criterion is to evaluate RE+FE≥WINDOW*threshold, RE and FE are the counts of rising-edge and falling-edge windows, respectively, "WINDOW" represents the size of the windows 304, and "threshold" represents a threshold percentage that can be set as a hyperparameter and estimated by cross-validation. An exemplary value for the threshold percentage is about 60%. Thus, if the window size is five, then at least three windows would need to be counted as RE or FE windows to meet the criterion. If the divergence criterion is met, block 510 indicates that the accuracy curve has diverged. If not, block 508 indicates that the accuracy curve has not diverged.

Figure 6:
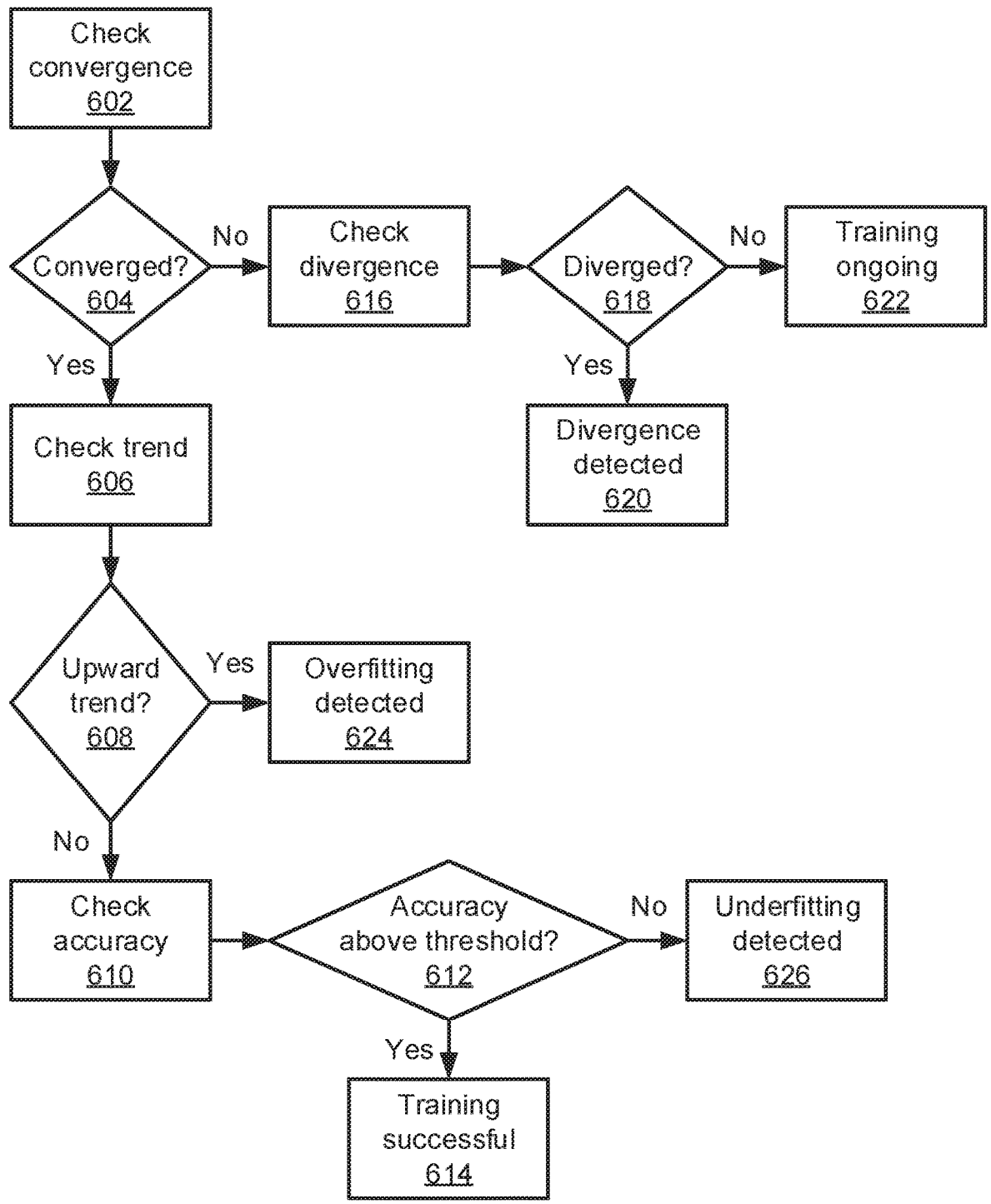
FIG. 6 is a block/flow diagram of a method of determining the status of a machine learning model training process based on the training accuracy curve in accordance with an embodiment of the present invention.

Referring now to FIG. 6, a method for monitoring the status of machine learning training. Block 602 checks for convergence of the training accuracy curve, for example following the method described above. If block 604 fins that the curve has converged, block 606 checks the trend of the curve (e.g., whether the curve is trending upward or downward). If block 608 finds that the trend is not upward, block 610 checks the accuracy of predictions generated by the machine learning model. Block 612 compares the accuracy to a threshold. If the accuracy is above the threshold, then block 614 indicates that training has been completed successfully. If not, then block 626 determines that the training process is underfitting the data.

If block 604 found that the curve has not converged, block 616 checks for divergence, for example following the method described above. If block 618 finds that the curve has diverged, block 620 indicates that divergence has been detected. Otherwise, block 622 indicates that training is still ongoing. If block 608 found that the trend of the training accuracy curve is upward, block 624 indicates that the training process is overfitting the data.

In some circumstances, where the machine learning model performs calculations that are invalid according to some criterion, a first step can be added that checks for such invalid calculations. In such a case, the remaining steps for training status can be skipped because the machine learning model is not producing valid outputs.

Figure 7:
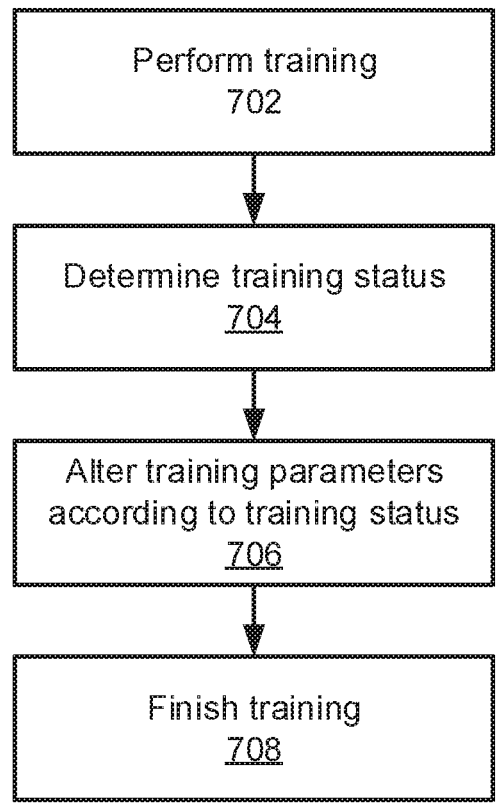
FIG. 7 is a block/flow diagram of a method of training a machine learning model by altering the parameters of training based on a determined training status in accordance with an embodiment of the present invention.

Referring now to FIG. 7, a method of training a machine learning model is shown. Block 702 begins the training process using a set of training data. As noted above, the machine learning model is specifically contemplated as being a neural network, but other types of machine learning models can be used instead. Block 704 determines the status of the training process in the manner described above. The status can be checked at any appropriate interval. Exemplary points for checking the status can include every training iteration, after a set period of time, or at a test interval defined by a user.

Block 704 determines whether the training process is, for example, complete, diverged, ongoing, overfitted, or underfitted. In the case of divergence, overfitting, and underfitting, block 706 adjusts parameters of the training process to improve the outcome. For example, if overfitting is detected, additional training data can be provided. If underfitting is detected, additional layers can be added to the neural network, such as a skip layer. Block 708 then finishes training using the new parameters. In some embodiments, blocks 704, 706, and 708 can be repeated until it is determined that training is successful.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 8:
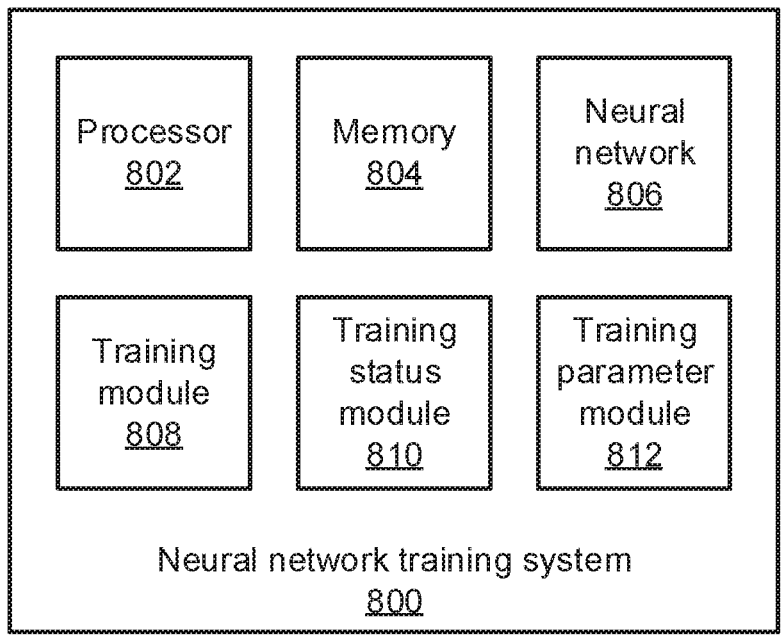
FIG. 8 is a block diagram of a neural network training system that trains a neural network by altering the parameters of training based on a determined training status in accordance with an embodiment of the present invention.

Referring now to FIG. 8, a neural network training system 800 is shown. The system 800 includes a hardware processor 802 and memory 804. The system 800 furthermore implements a neural network 806, for example in software or in a hardware embodiment. It should be understood that the neural network training system 800 and the neural network 806 are described in this manner for the purpose of illustration and that other forms of machine learning models can be used instead of neural networks.

The system 800 further includes one or more functional modules that may, in some embodiments, be implemented as software that is stored in the memory 804 and that is executed by the hardware processor 802. In other embodiments, one or more of the functional modules can be implemented as one or more discrete hardware components in the form of, e.g., application specific integrated chips or field programmable gate arrays. A training module 808 trains the neural network 808 using a set of training data. The training process uses part of the training data to train the network and another part of the training data to perform validation of the trained neural network's outputs. A training status module 810 monitors the status of the training process by measuring the accuracy of the neural network using, e.g., a loss function over time. A training parameter module 812 controls parameters of the training process using the status determined by the training status module 810.

Figure 9:
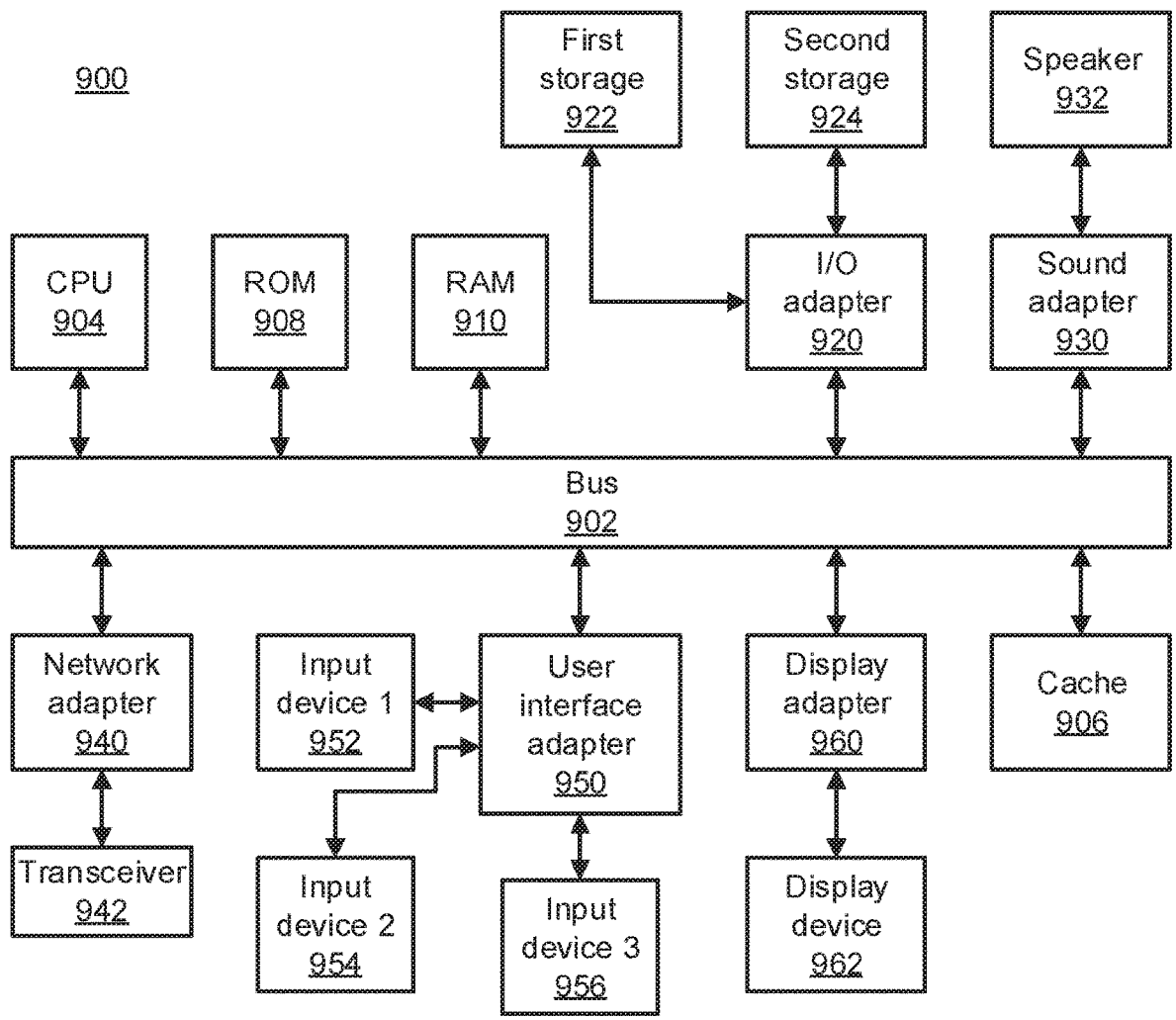
FIG. 9 is a block diagram of an illustrative processing system in accordance with an embodiment of the present invention.

Referring now to FIG. 9, an exemplary processing system 900 is shown which may represent the transmitting device 100 or the receiving device 120. The processing system 900 includes at least one processor (CPU) 904 operatively coupled to other components via a system bus 902. A cache 906, a Read Only Memory (ROM) 908, a Random Access Memory (RAM) 910, an input/output (I/O) adapter 920, a sound adapter 930, a network adapter 940, a user interface adapter 950, and a display adapter 960, are operatively coupled to the system bus 902.

A first storage device 922 and a second storage device 924 are operatively coupled to system bus 902 by the I/O adapter 920. The storage devices 922 and 924 can be any of a disk storage device (e.g., a magnetic or optical disk storage device), a solid state magnetic device, and so forth. The storage devices 922 and 924 can be the same type of storage device or different types of storage devices.

A speaker 932 is operatively coupled to system bus 902 by the sound adapter 930. A transceiver 942 is operatively coupled to system bus 902 by network adapter 940. A display device 962 is operatively coupled to system bus 902 by display adapter 960.

A first user input device 952, a second user input device 954, and a third user input device 956 are operatively coupled to system bus 902 by user interface adapter 950. The user input devices 952, 954, and 956 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 952, 954, and 956 can be the same type of user input device or different types of user input devices. The user input devices 952, 954, and 956 are used to input and output information to and from system 900.

Of course, the processing system 900 may also include other elements (not shown), as readily contemplated by one of skill in the art, as well as omit certain elements. For example, various other input devices and/or output devices can be included in processing system 900, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 900 are readily contemplated by one of ordinary skill in the art given the teachings of the present principles provided herein.

Having described preferred embodiments of automatic monitoring and adjustment of machine learning model training (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for training a machine learning model, comprising:
   training a machine learning model using training data;
   determining a status of the machine learning model's training based on an accuracy curve of the machine learning model over the course of the training, including determining whether the training has diverged by comparing a sum of number of windows representing a rising edge and the number of windows representing a falling edge to a threshold number, wherein the threshold number is a product of a window size and a threshold percentage hyperparameter;
   adjusting parameters of the training based on the status; and
   finishing training of the machine learning model using the adjusted parameters.

2. The computer-implemented method of claim 1, wherein determining the status comprises determining that the training has a status selected from the group consisting of diverged, overfitted, and underfitted.

3. The computer-implemented method of claim 1, wherein determining the status comprises determining that the training has converged.

4. The computer-implemented method of claim 3, wherein determining that the training has converged comprises measuring a slope of the accuracy curve in a plurality of windows.

5. The computer-implemented method of claim 1, wherein determining whether the training has diverged comprises determining whether each of a plurality of windows represents a rising edge or a failing edge.

6. The computer-implemented method of claim 1, wherein determining the status comprises determining that the training has overfitted to the training data.

7. The computer-implemented method of claim 1, wherein determining the status comprises determining that the training has underfitted to the training data.

8. The computer-implemented method of claim 1, wherein adjusting parameters comprises performing an action selected from the group consisting of adding additional training data and modifying a structure of the machine learning model.

9. The computer-implemented method of claim 1, wherein the machine learning model is a neural network.

10. A non-transitory computer readable storage medium comprising a computer readable program for training a machine learning model, wherein the computer readable program when executed on a computer causes the computer to perform the steps of:
training a machine learning model using training data;
determining a status of the machine learning model's training based on an accuracy curve of the machine learning model over the course of the training, including determining whether the training has diverged by comparing a sum of the number of windows representing a rising edge and the number of windows representing a falling edge to a threshold number, wherein the threshold number is a product of a window size and a threshold percentage hyperparameter;
adjusting parameters of the training based on the status; and
finishing training of the machine learning model using the adjusted parameters.

11. A system for training a machine learning model, comprising:
a processor device;
a machine learning model;
a training module configured to train the machine learning model using training data;
a training status module configured to use the processor device to determine a status of the machine learning model's training based on an accuracy curve of the machine learning model over the course of the training, including a determination of whether the training has diverged based on a comparison of a sum of the number of windows representing a rising edge and the number of windows representing a falling edge to a threshold number, wherein the threshold number is a product of a window size and a threshold percentage hyperparameter;
a training parameter module configured to adjusting parameters of the training based on the status, wherein the training module is further configured to finish training the machine learning model using the adjusted parameters.

12. The system of claim 11, wherein determining the status comprises determining that the training has a status selected from the group consisting of diverged, overfitted, and underfitted.

13. The system of claim 11, wherein determining the status comprises determining that the training has converged.

14. The system of claim 13, wherein determining that the training has converged comprises measuring a slope of the accuracy curve in a plurality of windows.

15. The system of claim 11, wherein determining that the training has diverged comprises determining whether each of a plurality of windows represents a rising edge or a falling edge.

16. The system of claim 11, wherein determining the status comprises determining that the training has overfitted to the training data.

17. The system of claim 11, wherein determining the status comprises determining that the training has underfitted to the training data.

18. The system of claim 11, wherein adjusting parameters comprises performing an action selected from the group consisting of adding additional training data and modifying a structure of the machine learning model.

* * * * *